United States Patent [19]
Steiner et al.

[11] Patent Number: 5,944,371
[45] Date of Patent: Aug. 31, 1999

[54] LOAD PANEL FOR THE LUGGAGE AREA OF A MOTOR VEHICLE

[75] Inventors: Karl Steiner, Ebergassing; Richard Hahnekamp, Eisenstadt; Manfred Mitrowitz, Purbach, all of Austria; Siegfried Stöckl, Pfeffenhausen; Hans Wolfmüller, Erding, both of Germany

[73] Assignee: Magna Eybl Ges.m.b.h., Ebergassing, Austria

[21] Appl. No.: 08/972,570

[22] Filed: Nov. 18, 1997

[30] Foreign Application Priority Data

Nov. 18, 1996 [AT] Austria ................. A2011/96

[51] Int. Cl.$^6$ .................................................. B60P 1/52
[52] U.S. Cl. ............................. 296/26.09; 296/189
[58] Field of Search ................. 296/26.01, 26.08, 296/26.09, 189; 414/522

[56] References Cited

U.S. PATENT DOCUMENTS

| | | | |
|---|---|---|---|
| 3,006,487 | 10/1961 | Gelli | 414/522 |
| 3,132,755 | 5/1964 | Greenslate | 414/522 |
| 3,768,673 | 10/1973 | Nydam et al. | 414/522 |
| 4,950,123 | 8/1990 | Brockhaus | 296/26.09 |
| 5,046,913 | 9/1991 | Domek et al. | 414/522 |
| 5,322,335 | 6/1994 | Niemi | 296/97.23 |
| 5,454,684 | 10/1995 | Berens | 414/522 |
| 5,584,524 | 12/1996 | Vogel | 414/522 |

FOREIGN PATENT DOCUMENTS 1097389  3/1981  Canada ................................. 414/522

Primary Examiner—Dennis H. Pedder
Attorney, Agent, or Firm—Watson Cole Grindle Watson, P.L.L.C.

[57] ABSTRACT

A load panel for the luggage area of a motor vehicle, in particular a passenger car, runs on three or more rollers and may be pulled out from the trunk at least partially, approximately parallel to the vehicle bottom. In order to increase crash safety while offering a high load-bearing capacity of the load panel, the proposal is put forward that the panel have at least one predefined folding line running transversely to the direction of vehicle motion and that at least one securing device be provided to prevent the retracted panel from moving forwardly relative to the bottom of the vehicle.

11 Claims, 3 Drawing Sheets

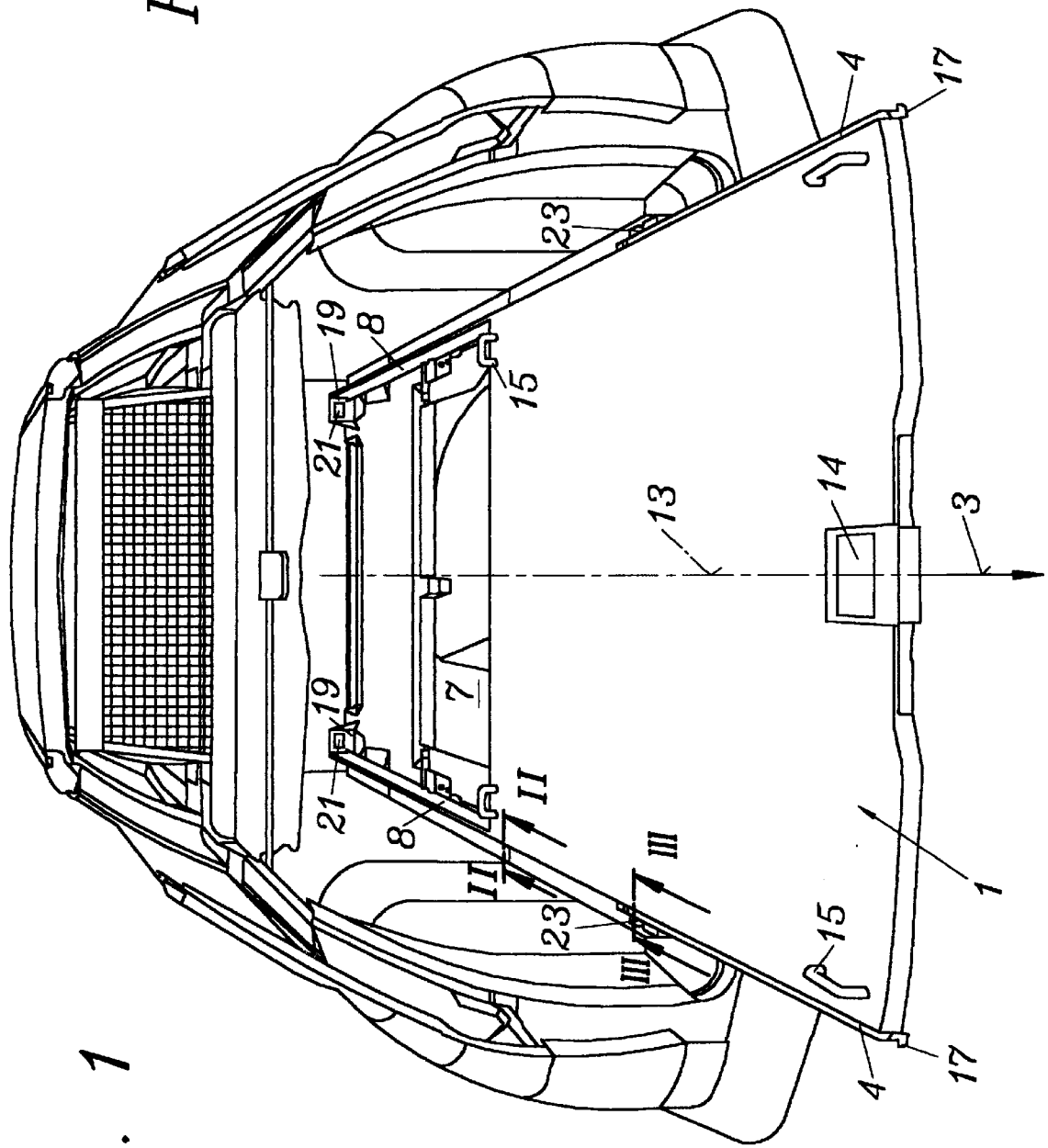
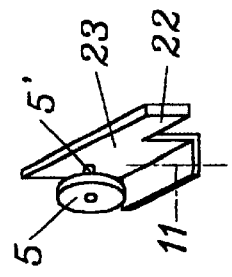

LOAD PANEL FOR THE LUGGAGE AREA OF A MOTOR VEHICLE

BACKGROUND OF THE INVENTION

This invention relates to a load panel for the luggage area of a motor vehicle, in particular a passenger car, which panel runs on at least three rollers and may be pulled out, at least partially, from the luggage area, approximately parallel to the vehicle bottom.

The term load panel usually refers to the plate covering the part of the car body defining the trunk of a vehicle. The space beneath the load panel is often used for storing the spare tire or as additional luggage area. In conventional vehicles the load panel is configured as a rigid, non-sliding part. Access to the space underneath usually is provided by folding up the load panel, or by incorporating pass-through hatches. With non-sliding load panels of a known type the loading and unloading of a vehicle is often troublesome, especially if bulky or heavy goods are to be handled.

DESCRIPTION OF THE PRIOR ART

A load panel of the above type, which may be withdrawn from the cargo area roughly in parallel to the vehicle bottom, is disclosed in U.S. Pat. No. 3,132,755 A. By means of this panel loading and unloading of the vehicle is greatly facilitated by permitting the cargo to be placed on a movable surface. The load is deposited on the drawn-out panel, with which it may be slid into the cabin with little physical effort. To ensure a high load-carrying ability, the load panel is configured as a solid plate. In the instance of a crash from the rear, however, this plate could penetrate into the passenger area and endanger passenger safety.

SUMMARY OF THE INVENTION

It is an object of this invention to avoid the above disadvantages and to increase crash safety while ensuring a high load-bearing capacity of the load panel.

According to the invention this object is achieved by providing that the load panel have at least one predefined folding line running transversely to the direction of vehicle motion and that at least one securing device be provided to prevent the retracted panel from moving forwardly relative to the bottom of the vehicle. One or more predefined folding lines would be possible. In case of a crash the trunk area will fold along the folding line(s) in a controlled manner. In this way legal requirements concerning crash behaviour can be met.

The predefined folding line may be formed by thinning the panel material in a locally confined area, preferably configured as a groove. In order not to impair the useful loading surface this groove is conveniently positioned on the underside of the panel. It is proposed in a variant of the invention that the groove be milled into the panel material to simplify manufacture. To improve crash safety the predefined folding line is conveniently positioned approximately in the middle between an area adjacent to the vehicle cabin and an area adjacent to the tail end of the load panel.

It is provided in a preferred variant of the invention that the securing device comprise a vehicle-mounted or a panel-mounted shackle and a panel-mounted or a vehicle-mounted projection interlocking therewith. It would be preferable in this context to provide two securing devices on either end of the load panel, i.e., both in the area adjacent to the vehicle cabin and in the area adjacent to the tail end. In case of a crash, in particular a rear crash, the projections and shackles will interlock immediately or after a small relative movement between load panel and vehicle, such that the load panel is secured on both its front and tail end, and is prevented from penetrating into the passenger space of the vehicle, especially in combination with the predefined folding line.

BRIEF DESCRIPTION OF THE DRAWINGS

The invention will now be further described with reference to the accompanying drawings, in which FIG. 1 is a perspective view of a vehicle shown with the load panel of the invention in the pulled-out state, FIG. 1a gives a detailed view of a roller bearing supporting bracket from FIG. 1.

DETAILED DESCRIPTION OF THE INVENTION

Figure 2:
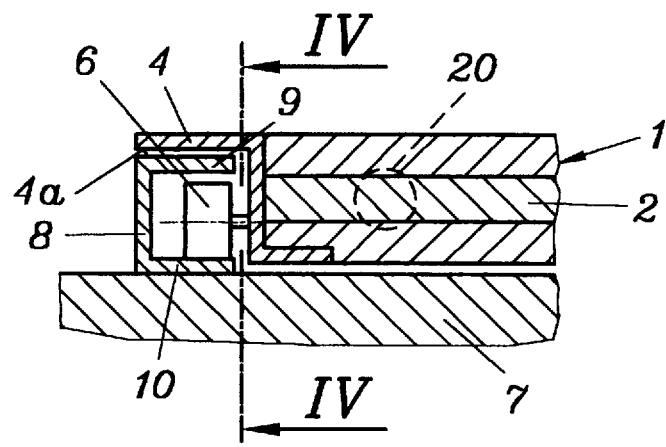
FIG. 2 shows a detail of the load panel in a section along line II—II in FIG. 1.
Figure 3:
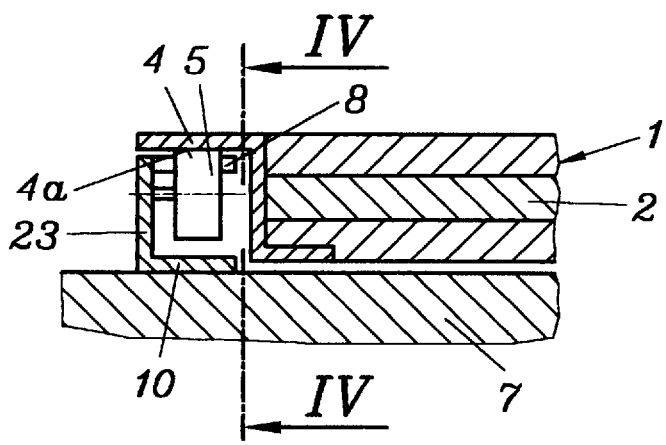
FIG. 3 shows a detail of the load panel according to line III—III in FIG. 1.

The load panel 1 preferably is configured as a laminated wood panel 2. The lateral edges of panel 2 are provided with Z-shaped sections 4 imparting the necessary strength to the load panel 1 and forming the running tracks 4a for the vehicle-mounted rollers 5. On the side of the Z-section panel-mounted rollers 6 are positioned next to corners 1a and 1b adjacent to the vehicle. Axes 5' and 6' of rollers 5 and 6 are positioned parallel to each other and normal to the pull-out direction of the panel indicated by arrow 3. Rollers 5 and 6 preferably are made of plastic material in order to reduce a potential clattering noise during driving. In the area of each longitudinal side edge 1c and 1d of the load panel 1 a U-shaped section 8 is attached to the vehicle bottom 7. The interior surfaces of the two legs 9 and 10 of section 8 are used as running tracks 9a and 10a for the panel-mounted rollers 6. On the tail end of the U-section 8 vehicle-mounted rollers 5 are positioned on the inner side of the section, which slightly project beyond the upper member 9 of the section. Similar sliding systems are employed in cabinet-making, in connection with drawers. In the area of the vehicle-mounted rollers 5 the upper member 9 is recessed such that the rollers are enabled to roll on the running track 4a of the Z-section of the load panel 1. The load panel 1 is thus supported by the section 8 via the panel-mounted rollers 6 in the area 1e adjacent to the vehicle cabin, and via the vehicle-mounted rollers 5 in the area 1f adjacent to the tail end.

Figure 4:
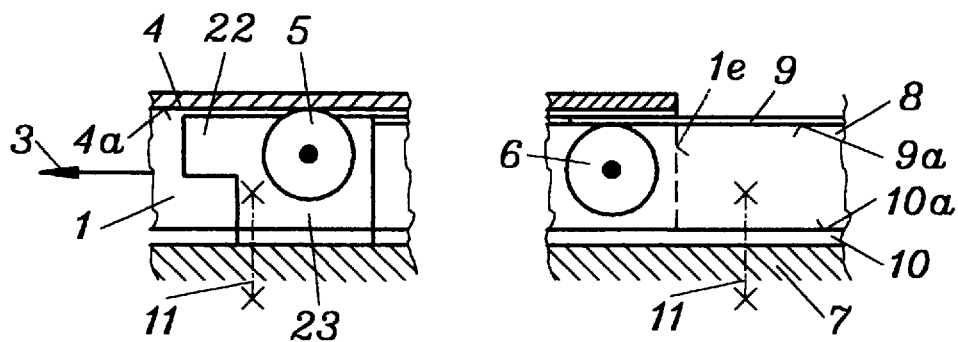
FIG. 4 shows a further detail of the load panel according to line IV—IV in FIGS. 2 and 3, FIG. 5 gives a view of the load panel from below in the retracted state

FIG. 4 shows the area of the load panel 1 in the pulled-out state where it is supported by rollers 5 and 6. It is seen clearly that the load panel 1 is supported via section 4 by the vehicle-mounted rollers 5 and via the panel-mounted rollers 6 by the upper member 9 of the U-section. Section 8 is fastened to the vehicle bottom 7 by screws 11.

Figure 5:
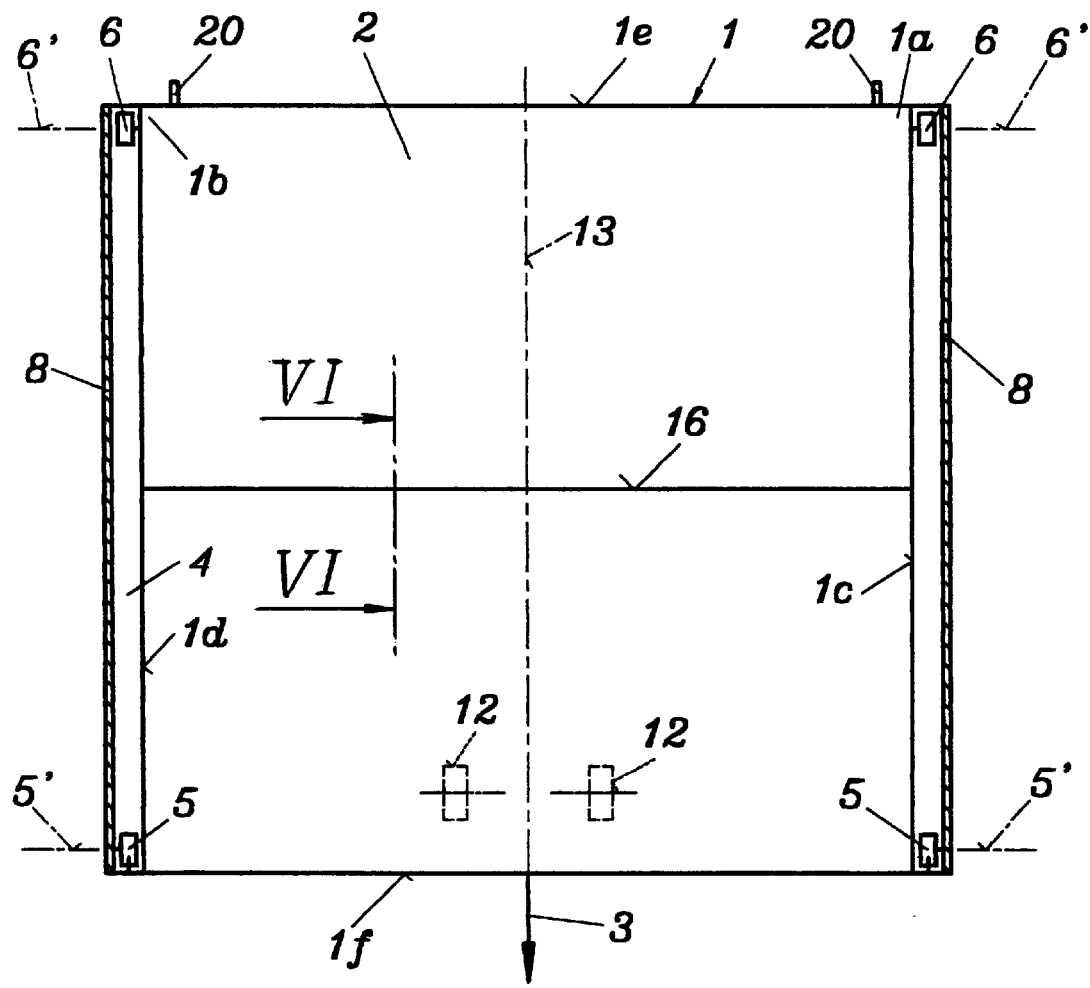
Figure 6:
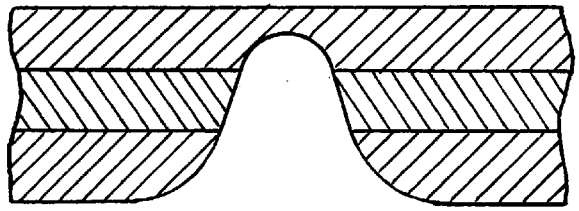
FIG. 6 shows a cross-section of the panel groove.

FIG. 5 shows a load panel 1 of the invention in the retracted state, in a view from below. Numeral 12 refers to two vehicle-mounted rollers indicated by broken lines, which support the load panel 1 in the area of its longitudinal symmetry plane 13.

As is shown in FIG. 1, the load panel 1 exhibits an operating handle 14 in the area of its longitudinal symmetry plane 13, to release the load panel from its retracted position. In corners 1a, 1b fastening straps 15 may be provided on the load panel 1 to secure the cargo. By means of a milled-in groove 16 forming a predefined folding line on the lower side of the load panel 1 (FIG. 5), which will lead to controlled folding of the load panel 1 in the instance of a crash, and two shackles 17, which are firmly attached to the Z-sections 4 and will arrest the panel's upward and forward movement in case of a crash, and two shackles 19, which are fastened to a transverse section 18 integrated in the car body and will prevent the panel from moving up front towards the passenger cabin in case of a crash, the load panel 1 is enabled to take up energy in the instance of an accident, thus fulfilling official crash requirements. In case of a crash, in particular from the rear, projections 20 shown in the top corners in FIG. 5, which are configured as arresting pins, will interlock with corresponding openings 21 in the shackles 19 (FIG. 1), as soon as the load panel starts shifting towards the passenger cabin. In addition, the lateral ends of the shackles 17 will engage a projection 22 which is mounted on the car body and turned towards the tail end. According to the detail presented in FIG. 1a projection 22 may be constituted by the vehicle-mounted roller bearing supporting bracket 23. By supporting and keeping down the load panel 1 in its front and rear, and by predefining a folding line along a milled-in groove 16, the load panel 1 is prevented from penetrating into the area of the passenger seats in case of a crash. Moreover, a controlled energy pickup is achieved.

We claim:

1. A load panel for the luggage area of a motor vehicle comprising, a motor vehicle including a passenger cabin, a rear end, and a luggage area having a bottom, a substantially planar load panel disposed adjacent said bottom and being movable between a retracted position within said luggage area and an extended position wherein it extends from said luggage area, a plurality of rollers movably supporting said load panel for movement between said retracted position and said extended position, said load panel including an area extending transverse to the direction of movement of said load panel and defining a fold line lying in the plane of said panel about which said panel is adapted to fold, said load panel having a front end and a rear end, said fold line being spaced a substantial distance from each of said ends, securing means for preventing the front end of said load panel from moving forwardly and upwardly relative to said passenger cabin, and additional securing means for preventing the rear end of said load panel in retracted position from moving upwardly relative to the bottom of said luggage area or forwardly relative to the rear end of said vehicle, so that when force is applied to the rear end of said load panel, the panel folds about said fold line and the fold line moves upwardly out of the plane occupied by said panel in its retracted position.

2. Apparatus as defined in claim 1 wherein said securing means comprises a first securing member connected to the front end of said load panel and a second securing member connected to said vehicle, said first and second securing members being interengageable with one another.

3. Apparatus as defined in claim 2 wherein said first securing member comprises a projection extending forwardly from said front end of the load panel, said second securing member receiving said projection.

4. Apparatus as defined in claim 1 wherein said load panel has opposite sides, said securing means including securing members disposed at opposite sides of the front end of said load panel.

5. Apparatus as defined in claim 1 wherein said additional securing means comprises a first rear securing member connected to the rear end of said load panel and a second rear securing member connected to said vehicle, said first and second rear securing members being interengageable with one another.

6. Apparatus as defined in claim 5 wherein said first rear securing member comprises a projection extending laterally from said load panel adjacent the rear end thereof, said second rear securing member engaging said projection.

7. Apparatus as defined in claim 1 wherein said load panel has a thickness, said area being of reduced thickness.

8. Apparatus as defined in claim 7 wherein said area of reduced thickness comprises a groove formed in said load panel.

9. Apparatus as defined in claim 8 wherein said load panel has a load supporting side and an opposite underside, said groove being formed in said underside.

10. Apparatus as defined in claim 9 wherein said groove is a milled-in groove.

11. Apparatus as defined in claim 1 wherein said fold line is disposed approximately midway between the front end and the rear end of said panel.

\* \* \* \* \*